F. E. PAYNE.
PROCESS OF MAKING RUBBER FOOTWEAR.
APPLICATION FILED JAN. 19, 1916.
1,189,866.
Patented July 4, 1916.
3 SHEETS—SHEET 1.
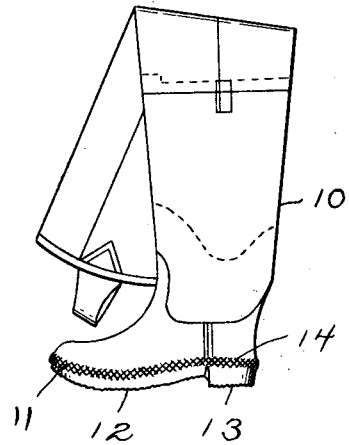
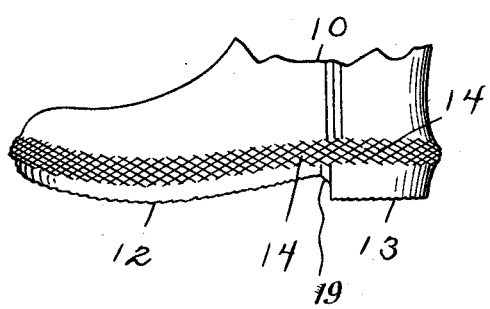
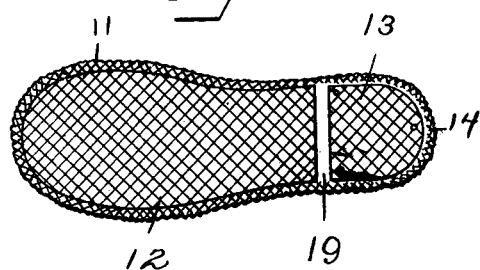
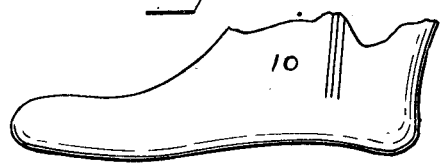
Inventor:
Fred E. Payne.
By Louis M. Schmidt
Atty.

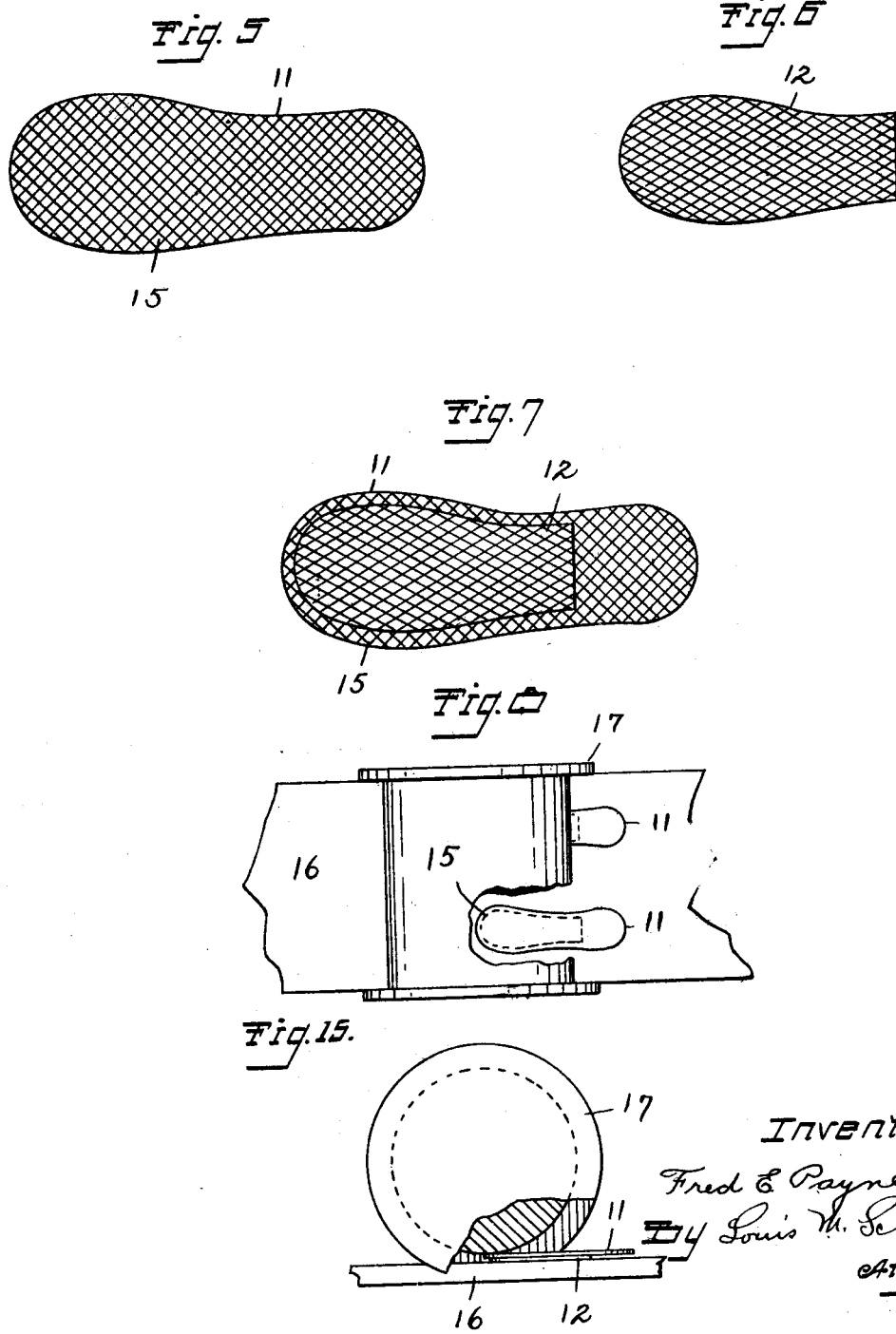

F. E. PAYNE.
PROCESS OF MAKING RUBBER FOOTWEAR.
APPLICATION FILED JAN. 19, 1916.
1,189,866.
Patented July 4, 1916.
3 SHEETS—SHEET 3.
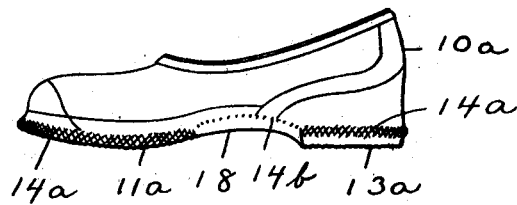
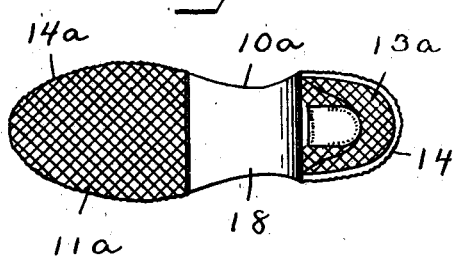
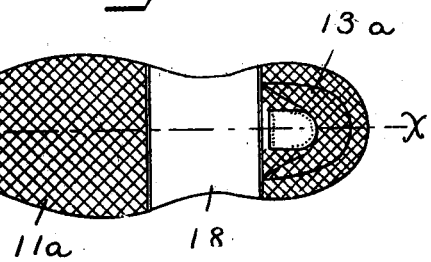
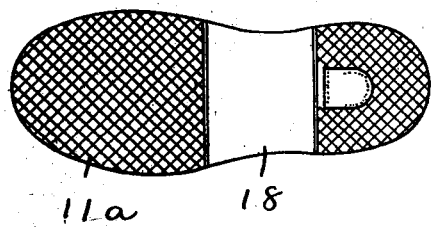
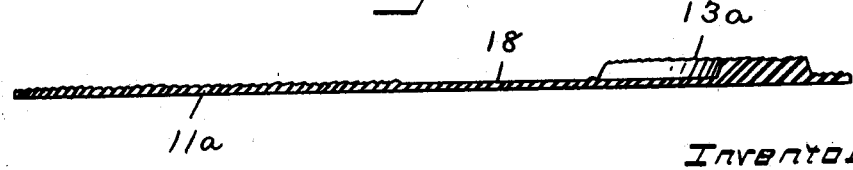

UNITED STATES PATENT OFFICE.

FRED ERNEST PAYNE, OF MIDDLETOWN, CONNECTICUT, ASSIGNOR TO GOODYEAR RUBBER COMPANY, OF MIDDLETOWN, CONNECTICUT, A CORPORATION.

PROCESS OF MAKING RUBBER FOOTWEAR.

1,189,866.      Specification of Letters Patent.      Patented July 4, 1916.

Application filed January 19, 1916. Serial No. 72,928.

*To all whom it may concern:*

Be it known that I, FRED ERNEST PAYNE, a citizen of the United States, residing at Middletown, in the county of Middlesex and State of Connecticut, have invented certain new and useful Improvements in Processes of Making Rubber Footwear, of which the following is a specification.

My invention relates to improvements in processes of making rubber footwear, and the object of my improvement is simplicity and economy in construction and convenience and efficiency in use, and has particular reference to providing a double sole and an enlarged, roughened bead along the edge portion of the sole and extending around between the body and heel, being a continuation of the application filed May 14, 1915, Serial No. 28,165, so far as it shows and describes subject matter which is common to the two applications; the process described being also applicable for producing heel structures such as shown and described in the patent granted to me under date of Nov. 30, 1915, No. 1,161,870.

In the accompanying drawing:—Figure 1 is a side elevation of a rubber boot having a sole made by my improved process. Fig. 2 is a similar view, on an enlarged scale, of the foot and sole portion of the same. Fig. 3 is a bottom view of the same. Fig. 4 is a side elevation of the boot portion previous to the application of the sole and heel. Fig. 5 is a bottom view of the sole base. Fig. 6 is a similar view of the sole bottom. Fig. 7 is a similar view of the sole structure composed of the sole base and sole bottom. Fig. 8 is a plan view of the table and roll and a pair of sole structures thereon, the roll being in part broken away. Fig. 9 is a side elevation, on the same scale as Fig. 1, of a rubber shoe such as shown in the patent mentioned, having a heel lift secured by my invention. Fig. 10 is a bottom view of the same. Fig. 11 is a bottom view of the sole base and heel lift previous to the application of the same to the shoe body. Fig. 12 is a similar view of the sole base only. Fig. 13 is a plan view of the heel lift. Fig. 14 is a sectional view on an enlarged scale on the line *x—x* of Fig. 11. Fig. 15. (Sheet 2) is a side elevation, in part broken away and in section, of the parts shown in Fig. 8, and on the same scale as the said figure.

My improved boot comprises a boot body 10 of substantially ordinary form having a sole base 11, the body portion of which corresponds to the tread portion or sole proper in boots of ordinary construction, and a sole bottom 12 in the form of an additional thickness or layer extending over the sole portion of the sole base 11, the heel 13 being secured to the heel portion of the sole base 11 in an ordinary manner, and also a relatively enlarged bead or swelling 14 extending along the edge of the sole base 11 and extending upwardly an appreciable distance along the boot body, the said bead 14 passing entirely around the lower part of the said boot body. That is to say, the bead 14 also extends around the heel portion of the boot structure, between the heel 13 and the body 10 of the boot. Furthermore, the bottom of the sole base 11, opposed to the sole bottom 12, is roughened or knurled and the manner of securing these parts together is an important part of my invention.

In carrying out my process I provide the sole base 11, knurled as shown at 15, on the lower side, of sufficient size to cover the entire lower surface of the boot body, including both the sole portion and the heel portion, and also to extend upwardly along the sides of the said body to the extent desired to form the bead 14, the same being in the unvulcanized condition when placed in position. The sole bottom, of the proper size to form the tread portion of the sole, is mounted on the sole base, the said sole bottom 12 being also initially in unvulcanized condition. Pressure is then applied to the said sole bottom 12 and base 11 in a special manner, to be described, serving to unite these parts to form the sole structure. The sole structure described is then applied to the bottom of the boot body, the bead portion 14 being brought into proper position along the side of the boot body 10. The heel 13 is also applied to the sole structure, the manner of doing this being ordinary, after which the boot is ready for vulcanizing. As shown there is a filler piece 19 along the front edge of the heel 13, which abuts against the sole bottom 12 and which is essentially a part of the heel structure.

Because of the knurled condition of the bottom of the sole base 11 I find it necessary to provide special means for securing the sole bottom 12 thereto in order to avoid pocketing air between these parts, which air would result in blisters and damaging the goods during the vulcanizing process and I do this in the following manner:—The sole base 11 and the sole bottom 12, one superimposed upon the other, are placed upon a table 16, having a flat top and a roll 17 is passed over the same, resulting in uniting the parts, there being however special features about the roll and the manner of manipulating the same.

I prefer to roll a pair of sole structures at the same time, and for doing this I provide a roll that is relatively heavy, having a weight of 700 pounds for men's size boots, and also of relatively large diameter, having a diameter of approximately 14 inches. The use of such a roll as described in conjunction with a flat table constitutes an important feature of my invention. At the same time I find it necessary in order to obtain a proper result to manipulate the roll in a special manner, and which consists in moving the roll at a relatively slow speed over the parts. The rate which I find necessary is about one half minute for the period for a pair of sole structures.

I believe the combination of the flat table, with the roll of large diameter and heavy weight and also the manner of manipulating the same at slow speed to be new.

By my process I am enabled to produce a boot having a double sole, and a beading having a knurled surface above the sole, and also having the beading extend around the heel portion, which features I also believe to be new.

As shown, the upper surface of the sole bottom 12, opposed to the knurled lower surface of the sole base 11, is originally plane or smooth, and the lower surface or tread portion is knurled.

As mentioned above, the process described is applicable for producing heel structures such as shown and described in Patent No. 1,161,879, in which case the U-shaped lift 13$^a$ shown in the said patent replaces the heel 13 of the rubber boot described above. The rubber shoe body 10$^a$ has a sole base 11$^a$, roughened or knurled on the lower face at the front and rear portions, the arch portion 18 being smooth. The front or body portion of the sole base 11$^a$ serves as the tread portion or sole proper, the extra sole bottom 12 being omitted, and at the heel portion there is mounted on the said sole base 11$^a$ the heel lift 13$^a$, of U-shape, which as mentioned is used in lieu of the solid heel 13. The bead or swelling at the lower part of the shoe body 10$^a$ comprises portions 14$^a$ of roughened, knurled character, extending along the sole and heel portions of the sole base 11$^a$, interrupted adjacent the arch portion 18 by a bead portion 14$^b$ which I prefer to be smooth, corresponding to the smooth character of the said arch portion 18.

The apparatus described is suitable for securing the heel lift 13$^a$ to the sole base 11$^a$. These parts are applied one to the other in the unvulcanized condition, the sole base 11$^a$ being placed on the table 16 and the roll 17 being passed over the heel lift superimposed thereon, the rolling being effected slowly to permit air to escape between the rough or knurled surface of the sole base 11$^a$ and the surface of the heel lift 13$^a$. The rough bead 14$^a$ is formed by the portion of the sole base 11$^a$ extending laterally beyond the heel lift 13$^a$ and the sole base proper.

After the heel lift has been applied to the sole base 11$^a$ in the manner described these parts as a unit are applied to the shoe body 10$^a$ and the parts vulcanized as usual.

Thus in the case of the boot 10 there is provided an extra tread portion 12 in the form of the sole bottom 12 at the front or sole portion of the sole base 11 and in the case of the overshoe 10$^a$ there is provided an extra tread portion 13$^a$ at the bottom of the rear or heel portion of the sole base 11$^a$, and in each case the said extra tread portion is secured to the said sole base 11 or 11$^a$ by my process, whereby the two parts are made essentially integral by the vulcanizing. Furthermore, as has been described the surface of the sole base 11 or 11$^a$ opposed to the extra tread portion 12 or 13$^a$ is roughened, and the union of the said surfaces notwithstanding the roughened character of one of the said surfaces is effected so as to make a substantially integral structure by means of my process, the rough surface of the sole base becoming merged into the opposed smooth surface of the extra tread portion. Thus it follows that by providing a marginal border portion 14 or 14$^a$, 14$^b$ to the sole base 11 or 11$^a$ that extends appreciably laterally beyond the dimensions of the said extra portions I am enabled to provide a beading, such as described, and having an exposed surface of rough or smooth character as desired. Of course my invention applies particularly to the feature of providing such a beading above the extra tread portion having an exposed surface of roughened character, and by my process this effect can be obtained in a manner that is serviceable and reliable. It is because of this latter feature that my process is particularly applicable to rubber footwear, in which, as in the case of articles of apparel generally, a slight change or improvement having merit has an appreciable effect on the art.

I claim as my invention:—

1. The process of forming a boot or shoe structure having a bead at the lower edge of the boot or shoe body with its exposed surface roughened and having an extra tread portion below the said bead, comprising providing a boot or shoe body having a closed bottom, providing a sole base of sufficient area to cover the said bottom and also to provide a margin to extend above the said bottom to form said bead, and providing an extra tread portion of sufficient area to cover a portion of the said bottom only, securing the said extra tread portion to the said sole base within the said margin to form a unitary structure therewith, and then securing the said unitary structure to the said boot or shoe body, the surface of the said sole base opposed to the said tread portion being roughened.

2. The process of forming a sole structure for a rubber boot or shoe comprising providing a sole base member having a knurled lower surface, and an extra tread member, both of the said members being of unvulcanized rubber, laying the said extra tread member on the said knurled lower surface of the said sole base member, placing the said members with the one so positioned above the other on a plane surface, and passing a roll over the superimposed members, whereby air will be forced from between the opposed surfaces of the said members and the said surfaces will be merged one with the other.

FRED ERNEST PAYNE.

Witnesses:
B. E. SPENCER,
LOUIS M. SCHMIDT.